US010154536B2

(12) United States Patent
Saraf

(10) Patent No.: US 10,154,536 B2
(45) Date of Patent: Dec. 11, 2018

(54) COMMUNICATION DEVICE AND METHOD FOR CLOSED SUBSCRIBER GROUP SELECTION

(71) Applicant: Intel IP Corporation, Santa Clara, CA (US)

(72) Inventor: Vishal Saraf, Nuremberg (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/355,139

(22) Filed: Nov. 18, 2016

(65) Prior Publication Data

US 2017/0181198 A1 Jun. 22, 2017

(30) Foreign Application Priority Data

Dec. 21, 2015 (DE) .................. 10 2015 122 353

(51) Int. Cl.
*H04W 76/40* (2018.01)
*H04W 4/08* (2009.01)
*H04W 36/30* (2009.01)
*H04W 48/20* (2009.01)
*H04W 88/06* (2009.01)
*H04W 84/04* (2009.01)

(52) U.S. Cl.
CPC ............. *H04W 76/40* (2018.02); *H04W 4/08* (2013.01); *H04W 36/30* (2013.01); *H04W 48/20* (2013.01); *H04W 84/045* (2013.01); *H04W 88/06* (2013.01)

(58) Field of Classification Search
CPC ..... H04W 76/002; H04W 4/08; H04W 36/30; H04W 88/06; H04W 76/40; H04W 48/20; H04W 84/045
See application file for complete search history.

(56) References Cited

U.S. PATENT DOCUMENTS

| 2012/0289282 | A1* | 11/2012 | Kobayashi | ............ H04W 48/02 455/525 |
| 2015/0126189 | A1* | 5/2015 | Rao | ........................ H04W 48/18 455/435.2 |
| 2015/0289114 | A1* | 10/2015 | Dandra | ................... H04W 4/08 370/329 |

FOREIGN PATENT DOCUMENTS

DE 102015206079 A1 10/2015

OTHER PUBLICATIONS

German Office Action based on Application No. 10 2015 122 353.8 (7 Pages) dated Oct. 6, 2016 (Reference Purpose Only).

* cited by examiner

*Primary Examiner* — Wayne H Cai
(74) *Attorney, Agent, or Firm* — Viering, Jentschura & Partner MBB

(57) ABSTRACT

A communication device and a method for connecting to a closed subscriber group (CSG) in a by storing received CSG information in a database in order to expedite CSG selections. The communication device is configured to store the CSG scan results, including supported radio access technologies (RATs) for each CSG cell, in a database and query the database for the CSG scan results upon manual selection of a CSG cell. After detecting a CSG cell, the communication device may further be configured to trigger a switch to the CSG cell after determining that the CSG cell is the highest ranked cell on its frequency, retrieving the CSG information from the database stored from a prior selection to the CSG cell, and performing a criteria check to ensure that the CSG cell is suitable for cell selection.

18 Claims, 11 Drawing Sheets

COMMUNICATION DEVICE AND METHOD FOR CLOSED SUBSCRIBER GROUP SELECTION

RELATED APPLICATIONS

This application claims priority of German patent application No. 10 2015 122 353.8, filed on Dec. 21, 2015, the entire contents of which are hereby incorporated herein by reference.

TECHNICAL FIELD

Various embodiments relate generally to devices and methods for closed subscriber group cell selection.

BACKGROUND

A network run by an operator in a country is known as a public landline mobile network (PLMN). This network may be a Long Term Evolution (LTE), Global System for Mobile Communications (GSM), Universal Mobile Telecommunications System (UMTS), etc. A mobile communication device, or user equipment (UE), attempts to connect with the PLMN when the UE is switched on, and it searches for a suitable PLMN to connect to, i.e. camp on, in order to obtain network services.

Femtocells (small, low-powered cellular base stations) have seen a rise in usage in recent years in order to provide better cellular reception in areas with weak network coverage and to unburden main network cells (i.e. macro cells) by reducing the number of phones trying to connect to it. A femtocell with a limited set of users with connectivity access is known as a closed subscriber group (CSG) cell. When a femtocell is configured to operate as a CSG cell, only users included in the femtocell's access control list are allowed access to the PLMN via the femtocell. Alternatively, a femtocell in a hybrid-CSG mode may also be configured to provide access to all users, but preferential treatment to the users on its access control list.

The Third Generation Partnership Project (3GPP) specifications regarding CSG selection present problems when a communication device, either manually or autonomously, selects a CSG cell for connecting to a network. For instance, in manual CSG selection, the communication device may attempt to connect to a target CSG cell via a radio access technology (RAT) which is not supported by the target CSG cell. This may result in a prolonged connection time as the communication device attempts to connect to the target CSG cell in a user specified RAT preference order. Also, in autonomous CSG selection, a communication device will attempt to connect to a CSG cell which is in proximity of the communication device even if the signal strength of the CSG cell does not fulfill the cell selection criteria. As a result, the communication device expends time and resources (e.g. power) attempting to connect to a CSG cell which cannot support the connection, resulting in an inconvenience to the end user.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
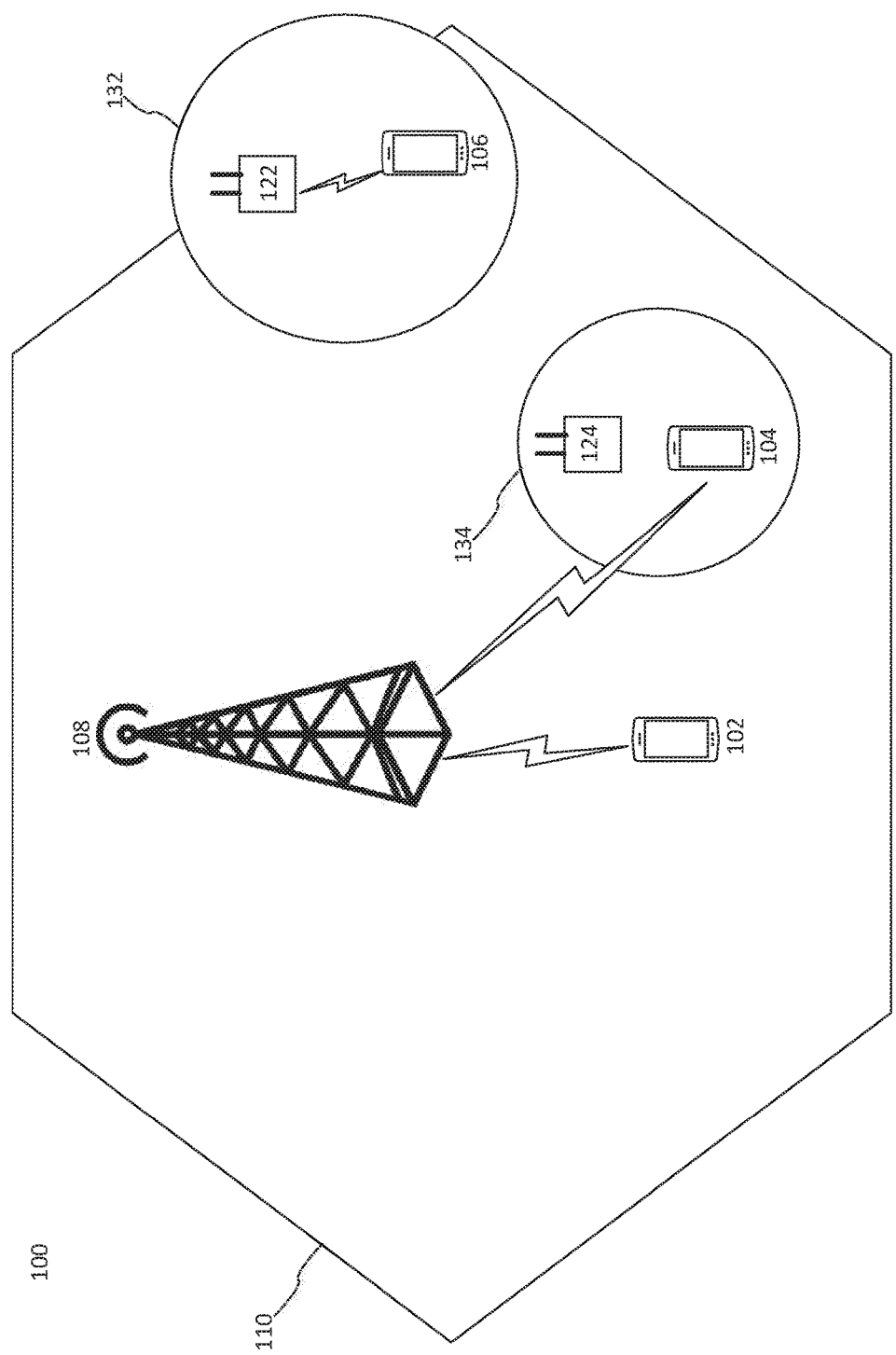
FIG. 1 shows an example of a communication network in an aspect of this disclosure.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

The terms "communication device," "user equipment (UE)," and "mobile terminal" are used interchangeably.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry" in the claims included herein, the use of "circuit" may be understood as collectively referring to two or more circuits.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

The term "base station" used in reference to an access point of a mobile communication network may be understood as a macro base station, Node B, evolved Node Bs (eNB), Remote Radio Head (RRH), relay point, etc.

The term "femtocell station" used in reference to an access point of a mobile communication network for a closed group subscriber (CSG) cell may be understood as a Home Node B (HNB), Home eNode B (HeNB), small cell station, etc.

As used herein, a "cell" in the context of telecommunications may be understood as a sector served by a base station, either by a macro base station such as a Node B or an eNB or by a femtocell station such as a HNM or HeNB (e.g. a CSG cell). Accordingly, a cell may be a set of geographically co-located antennas that correspond to a particular sectorization of a base station. A base station or a femtocell station may thus serve one or more "cells" (or sectors), where each cell is characterized by a distinct communication channel. Furthermore, the term "cell" may be utilized to refer to any of a macrocell, microcell, femtocell, picocell, etc.

It is appreciated that the ensuing description may detail exemplary scenarios involving mobile device operating according to certain 3GPP specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

As utilized herein, the term "idle mode" used in reference to a mobile terminal refers to a radio control state in which the mobile terminal is not allocated at least one dedicated communication channel of a mobile communication network. The term "connected mode" used in reference to a mobile terminal refers to a radio control state in which the mobile terminal is allocated at least one dedicated communication channel of a mobile communication network.

The 3GPP has introduced a Closed Subscriber Group (CSG) architecture in Long Term Evolution (LTE) to support CSG services. CSG cells are maintained by femtocell stations which provide an access point to a communication network, albeit to a much smaller range than a typical base station of a macrocell.

FIG. 1 shows a mobile communication network 100. Mobile communication network 100 may include at least mobile terminals 102-106 and a base station 108 with corresponding coverage region 110. Also part of mobile communication network 100 are femtocell stations 122-124 and their respective coverage regions, 132-134, which may be configured to be in CSG mode. It is appreciated that mobile communication network 100 is exemplary in nature and may thus be simplified for purposes of explanation.

Communications Network 100 may be configured in accordance with the network architecture of any one of, or any combination of, LTE (Long Term Evolution), WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc.

Base station 108 may be associated with a radio access section of mobile communication 100, i.e. the Radio Access Network (RAN) of mobile communication network 100. Base stations 108 may thus act as an interface between the RAN of mobile communication network 100 and an underlying core network of mobile communication network 100, and may allow any proximate mobile terminals, such as e.g. mobile terminals 102, 104 and/or 106, to exchange data with the core network of mobile communication network 100 and any further networks connected thereto.

The base station 108 may provide mobile communication coverage to coverage region 110. As shown in FIG. 1, mobile terminals 102-106 may be physically located within coverage region 110 of base station 108. It is appreciated that although coverage region 110 is depicted as having distinct boundaries, it is understood that coverage region 110 may overlap with another coverage region (not pictured), and accordingly there may exist geographical regions served by two or more of base stations. Likewise, there may be overlap between coverage regions 132-134 of femtocell stations 122-124. In this communication network 100, femtocell region 134 is completely within coverage region 110, while femtocell region 132 is partially inside and partially outside of coverage region 110.

As depicted in FIG. 1, mobile terminals 102-106 are physically located within coverage region 110. In this manner, mobile terminals 102-106 may access the RAN of mobile communication network 100 via the base station 108. However, in addition to accessing mobile communication network 100 via base station 108, the mobile terminals may also be able to access communication network 100 via femtocell stations 122-124.

Femtocell stations 122-124 provide access to mobile communication network 100 in a similar to the base station 108, albeit to a much smaller range. Femtocell stations 122-124 deliver the advantage of being able to improve cellular reception in areas that the base station 108 may provide weak coverage, e.g. inside homes or office buildings. Additionally, femtocell stations 122-124 may be configured to operate in closed subscriber group (CSG) mode. CSG allows the femtocell to serve only a limited set of users who are authorized to connect to it. In this manner, the femtocell may exclusively be allotted for use by only a limited set of subscribers, thereby providing seamless connection to mobile communication network 100.

For example, in FIG. 1, mobile terminal 106, while in coverage 110 of base station 108, may also fall within the coverage 132 of femtocell station 122. If mobile terminal 106 is on the Access Control List (ACL), or white list, of femtocell station 122, mobile terminal 106 can connect to the mobile communication network 100 via the femtocell station 122 instead of base station 108. If mobile terminal 106 leaves coverage area 132, mobile terminal 106 will be handed over to base station 108 for connection to mobile communication network 100. Upon re-entry into coverage area 132, mobile terminal 106 will be able to connect to mobile communication network 100 via femtocell station 122 again.

On the other hand, mobile terminal 104, while being within coverage area 134 of femtocell station 124, will not be able to connect to mobile communication network 100 via femtocell station 124 if femtocell station 124 is operating in CSG mode and mobile terminal 104 is not a member of the CSG, i.e. on femtocell station's 124 ACL. Mobile terminal 104 is still able to access mobile communication network 100 via base station 108.

Mobile terminal 102 is not within coverage of any of femtocell stations 122-124, so it will connect to the mobile communication network 100 via base station 108. If mobile terminal 102 is on the ACL of both femtocell stations 122-124, mobile terminal 102 will be able to connect to mobile communication network 100 via either of the femtocell stations once the mobile terminal is within either of their respective coverage regions.

A femtocell station operating in CSG mode will hereinafter be referred to as a CSG cell. A femtocell station may also operate in a hybrid mode, i.e. as a cell broadcasting a CSG ID which is accessible as a CSG cell by mobile terminals which are members of the CSG and as a normal cell by all other mobile terminals. This type of cell will hereinafter be referred to as a hybrid cell.

CSG cells may support various radio access technologies (RATs), e.g. LTE or UMTS. At any point when a mobile terminal detects that it is within coverage of a CSG cell, the mobile terminal will perform an autonomous cell selection/reselection towards the HNB of the CSG cell. In a similar manner, the user may also select to perform a manual CSG search in order to discover and attempt to connect to any CSG cells which are within range of the mobile terminal and which provide coverage (i.e. the mobile terminal is a subscriber) to the mobile terminal.

A CSG cell broadcasts several elements of system information to mobile terminals, including a CSG indicator (indicating whether it is a CSG cell), a CSG identity (CSG ID) (indicating which CSGs are supported), a HNB name (in plain text, used to assist human users in manual selection of CSG), and a physical cell identity range for CSG cells.

A CSG cell broadcasts a unique CSG ID, and the mobile terminal is able to access the CSG cell only if it contains the matching CSG ID on its device, e.g. on the subscriber identity module (SIM). In other words, a mobile terminal belonging to a CSG cell will have the corresponding CSG ID in its CSG whitelist. The CSG whitelist is maintained and provided by the Non-Access Stratum (NAS). A mobile terminal may be pre-loaded with authorized CSG IDs, or the mobile terminal may attempt to manually select a CSG cell in order to verify if it is allowed access to the CSG ID. Once the mobile terminal has connected to a CSG cell, the mobile terminal stores the CSG ID for automatic selection whenever the mobile terminal is within range of the CSG cell. By broadcasting its CSG ID, the CSG cells ensure that non-authorized mobile terminals will not camp on its cells in the early stages of cell selection without needing to set up a connection.

According to the 3GPP specifications (Chapter 6.1 of 3GPP TS 25.367 V9.5.0) in manual CSG ID selection, the mobile terminal may scan all frequencies in the supported frequency bands and display a list of found CSG IDs or the corresponding HNB names if broadcast by the CSG cells or hybrid cells and indications as to whether the found CSG IDs are contained in the mobile terminal's CSG whitelist. However, these specifications specify only CSG ID and the public landline mobile network (PLMN) identification (PLMN ID) for selection of a CSG cell. As a result, the mobile terminal searches for selected CSG cells in all the RATs supported by the mobile terminal in the user specified RAT preference order. If the user manually selects a CSG cell belonging to the lowest ranked RAT, then the mobile terminal may unnecessarily search the higher ranked RATs and later select the CSG cell belonging to the lowest ranked RAT. To sum up, current specifications for CSG forces the mobile terminal to search all frequencies supported by a mobile terminal to find the user selected CSG ID. The problem associated with this procedure is shown in FIG. 2.

Figure 2:
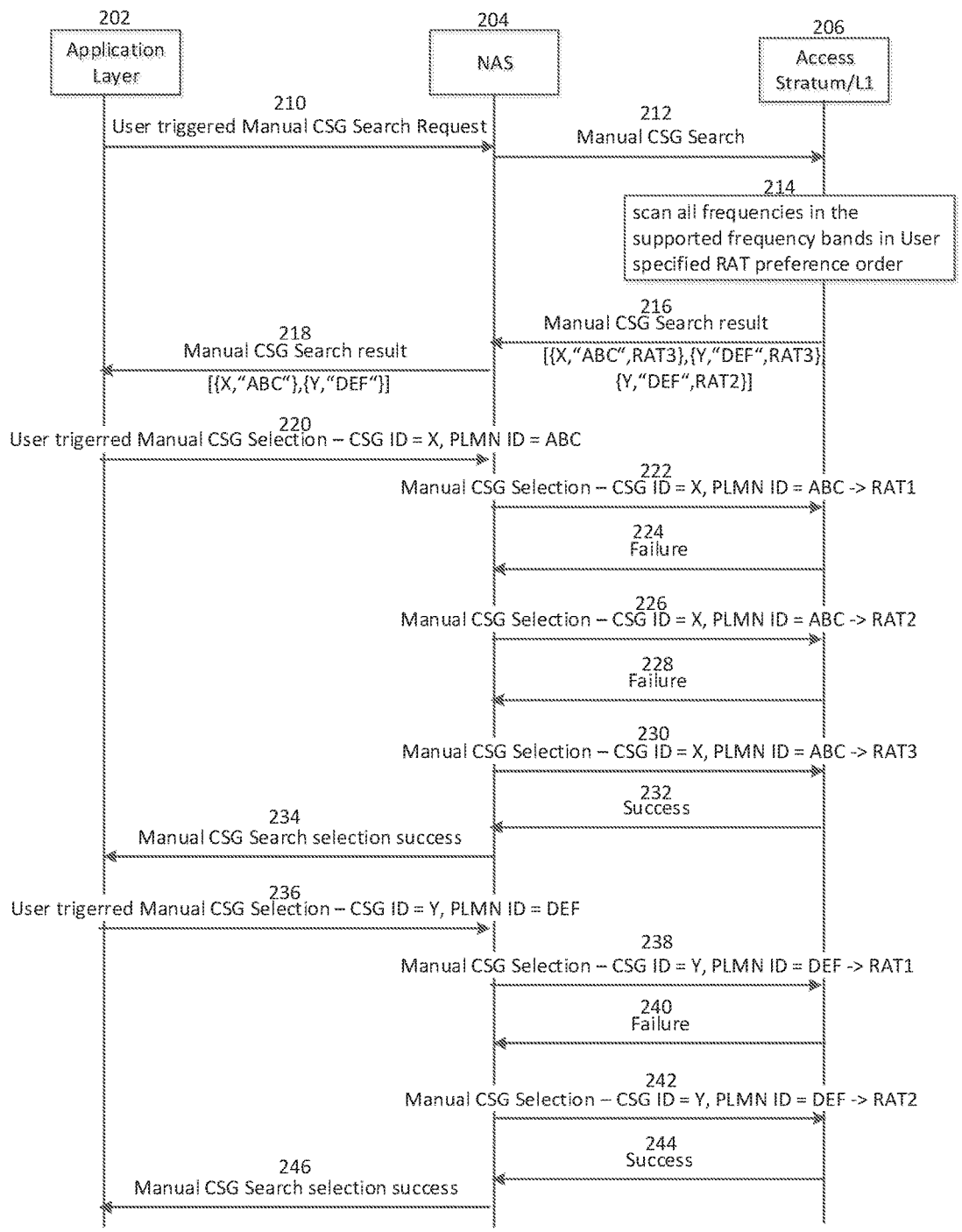
FIG. 2 shows an example of a message sequence chart (MSC) portraying a problematic manual CSG cell selection in an aspect of this disclosure.

FIG. 2 shows an example message sequence chart (MSC) 200 for the problematic existing method for CSG selection. In MSC 200, the user specified RAT preference is RAT1, RAT2, and RAT3. The three layers responsible for manual CSG selection are the Application Layer 202, the Non Access Stratum (NAS) 204, and the Access Stratum/layer 1 component (L1) 206. It is appreciated that MSC 200 is exemplary in nature and may thus be simplified for purposes of explanation.

The User triggered manual CSG search request is forwarded to the NAS by the Application layer 210. The NAS forwards the manual CSG search 212 to the Access Stratum/L1, which performs the scan in the supported frequency bands in the User specified RAT preference order, i.e. RAT1, RAT2, and RAT3.

The Access Stratum/L1 reports the Manual CSG search results back to the NAS 216. In this example, the results include that CSG ID "X" on PLMN "ABC" is supported by RAT3 while CSG ID "Y" on PLMN "DEF" is supported by both RAT2 and RAT3. The manual search results are then forwarded 218 to the Application Layer. It is important to note that these results only contain the CSG ID and PLMN ID of the CSG cells discovered in the scan. Thereafter, the User triggers the Manual CSG selection of CSG ID "X" on PLMN "ABC" 220.

According to the user specified preference order (i.e. RAT1, RAT2, and RAT3), the mobile terminal will first attempt to connect to selected CSG "X" via RAT1 in 222, which will result in a failure in connection 224, proceeded by an attempt to connect via RAT2 in 226, which also results in a failure in connection 228, and finally, will attempt to connect to the selected CSG ID via RAT3 in 230, which finally results in success 232. This CSG search selection success is reported back to the Application layer in 234.

A similar process is shown in 236-246 for a User triggered manual CSG selection for CSG ID "Y" on PLMN "DEF." However, in this case, the attempt to connect to CSG "Y" via RAT2 is successful 244, i.e. there is only one failure 240. This can be expected due to the manual CSG search results from 216.

As is evident from the MSC in FIG. 2, the 3GPP specifications for manual CSG selection present problems when manually attempting to connect to a selected CSG cell. Namely, the mobile terminal may make multiple unsuccessful attempts to connect to the selected CSG cell, which is both time and power consuming.

Figure 3:
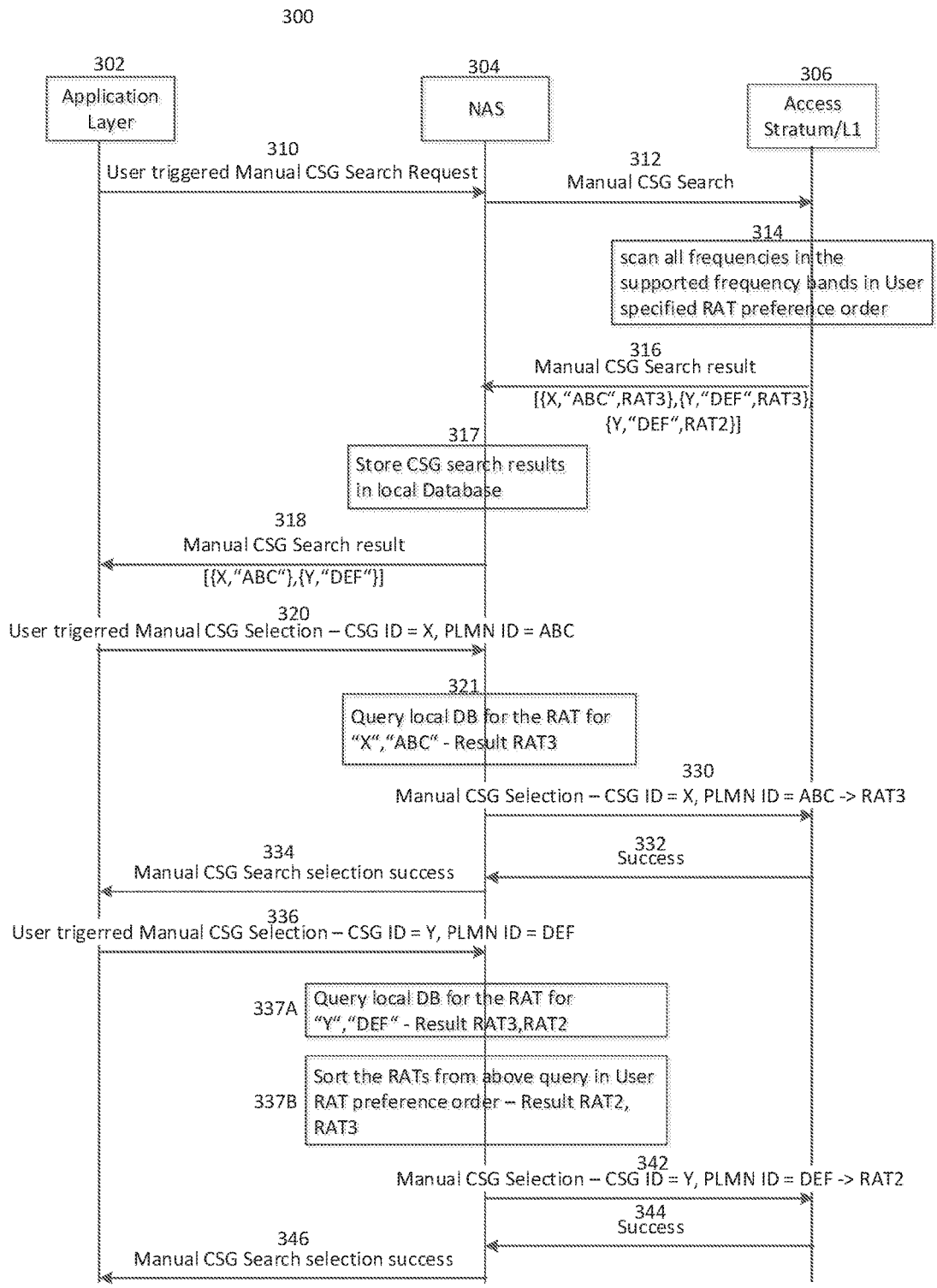
FIG. 3 shows an example of an MSC portraying a manual CSG cell selection using a database to store CSG results in an aspect of this disclosure.

FIG. 3 shows an exemplary MSC 300 of an embodiment of this disclosure in which a mobile terminal supporting CSG caches the RAT search information found during a manual CSG search and uses this information to set the RAT preference during user selection of a CSG ID. It is appreciated that MSC 300 is exemplary in nature and may thus be simplified for purposes of explanation.

MSC 300 starts out similarly to FIG. 2 in triggering a manual CSG search request, conducting the search, and reporting the results 310-316, however, upon receiving the Manual Search results from the Access Stratum/L1 in 316, the NAS stores the CSG search results, including the supported RATs, in a local database 317. This local database may be located in a memory component of the mobile terminal, e.g. a memory component of the baseband modem, SIM, etc. The local database will store the Manual Search results, for later use.

The manual CSG search results (i.e. the CSG ID and the PLMN ID for each CSG cell) are then forwarded 318 to the Application Layer. Thereafter, the User triggers the Manual CSG selection of CSG ID "X" on PLMN "ABC" in 320.

Unlike in the previous example, however, in an aspect of this disclosure, the NAS 304 will query the local database (DB) 321 where the Manual CSG search results were stored in 317 for the RAT supported for CSG ID "X" on PLMN "ABC." The local DB will return that RAT3 is supported by these parameters 321, and thereafter, the NAS will directly attempt to connect to CSG "X" on PLMN "ABC" on RAT3 (skipping RAT1 and RAT2) 330 resulting in immediate success 332, which is forwarded to the Application layer in 334. As a result of this aspect of the disclosure, the unsuccessful attempts on RAT1 and RAT2 are thereby avoided, resulting in both time and power being saved.

Similarly, when a user triggered manual CSG selection to CSG ID "Y" on PLMN "DEF" is triggered in 336, the NAS will query the local DB for the RAT with these parameters with the results being RAT3 and RAT2 337A. Again, these results can be traced back to the Manual CSG Search results being stored in the local DB in 317. In this case, there are two RATs (RAT3 and RAT2) that provide a connection to CSG "Y," so the RATs are sorted in the user specified RAT preference order (remember: RAT1, RAT2, and RAT3) 337B, resulting in an order of RAT2 and RAT3. The NAS will then trigger an automatic selection directly on RAT2 (skipping RAT1) 342, resulting in success 344. The successful search selection is then forwarded to the Application Layer in 346. As in the immediately successful selection for RAT3 on CSG "X," the immediate successful selection of RAT2 on CSG "Y" results in the preservation of both power and time.

If the User selected CSG ID and PLMN only has CSG cells belonging to one RAT (as is the case with CSG "X" in FIG. 3), then this RAT will be set as the RAT to use in the Manual CSG selection attempt, regardless of what the User specified RAT preference is. If the User selected CSG ID and PLMN has multiple CSG cells belonging to multiple RATs (similar to CSG "Y" in FIG. 3), then the user specified RAT preference order for the RATs in the manual CSG search results on the local DB will dictate the RAT selection order. In this manner, the mobile terminal is able to conserve resources (e.g. time and power).

In the case where there is an overlap between a macro cell region and a CSG cell (e.g. overlap between region 110 and 132 of FIG. 1) or the case where a macro cell region and a CSG cell region are in close proximity, a further complications relating to autonomous CSG selection according to the 3GPP specifications may apply.

Figure 4:
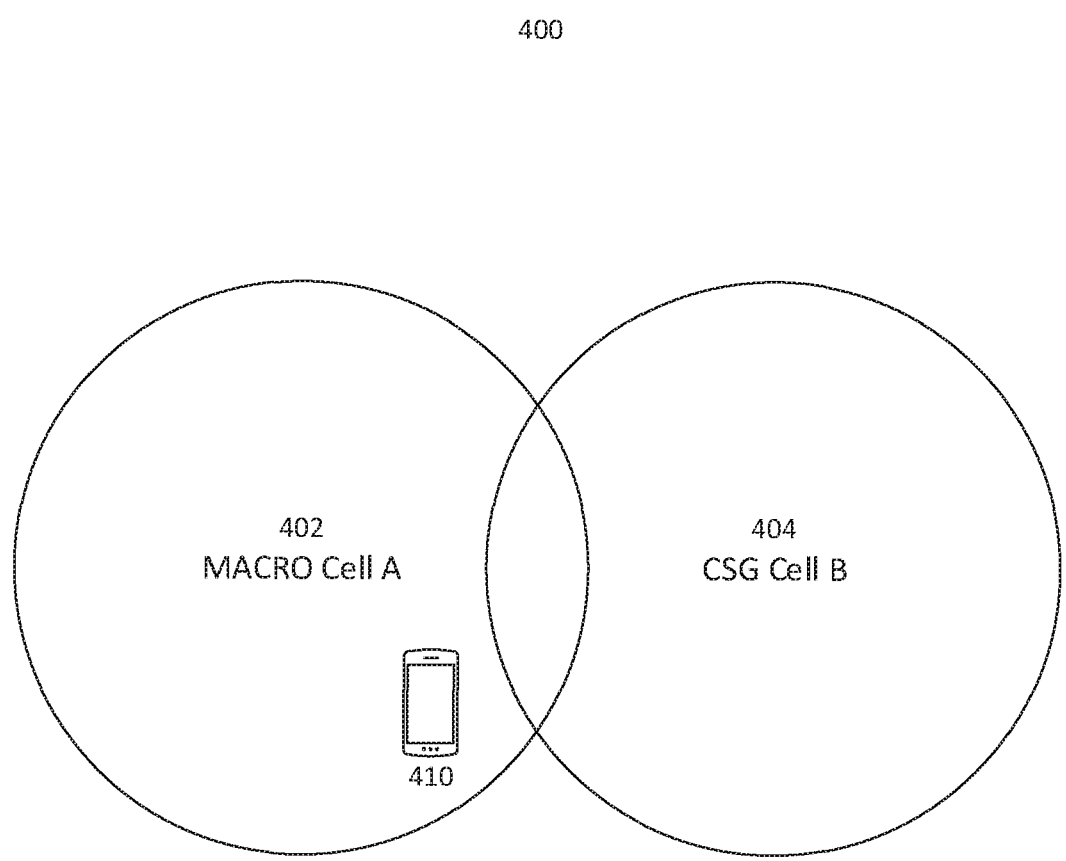
FIG. 4 shows an example of a communication device being camped on a macro cell in a network while in proximity of a CSG cell in an aspect of this disclosure.

An example depicting this problematic scenario is shown in FIG. 4. The 3GPP specifications may present an endless loop of re-selection between the CSG cell and the macro cell in this scenario, thereby inconveniencing the end user and draining the UE of its resources, e.g. power. It is appreciated that scenario 400 is exemplary in nature and may thus be simplified for purposes of explanation.

According to 3GPP TS 36.304 Section 5.2.4.8.1, in an autonomous CSG search, the cell selection/re-selection to a CSG cell is controlled only by the rank of the CSG cell on its frequency. If the CSG cell is the highest ranked on its frequency, then the mobile terminal automatically selects it for connection to a network.

For example, while camped on a macro cell A 402, if mobile terminal 410 detects a CSG cell, an autonomous CSG search will be triggered. During the autonomous CSG search, the mobile terminal 410 will be able to detect CSG cell B 404. If CSG Cell B 404 is the only CSG cell on its frequency, then it will de facto be the highest ranked CSG cell on its frequency. The mobile terminal 410 will automatically attempt re-selecting to CSG cell B 404. However, if the current CSG cell power levels do not fulfill the cell selection criteria, the re-selection will fail. The mobile terminal 410 will then reselect back to the macro cell A 402. After reselecting back to the macro cell A 402, the mobile terminal 410 will detect CSG Cell B again, and the mobile terminal 410 will repeat the above process in an attempt to select to CSG cell B 404, which would fail again. There could be an endless loop for cell selection between macro cell A 402 and CSG cell B 404 back to the macro cell 402, etc.

Figure 5:
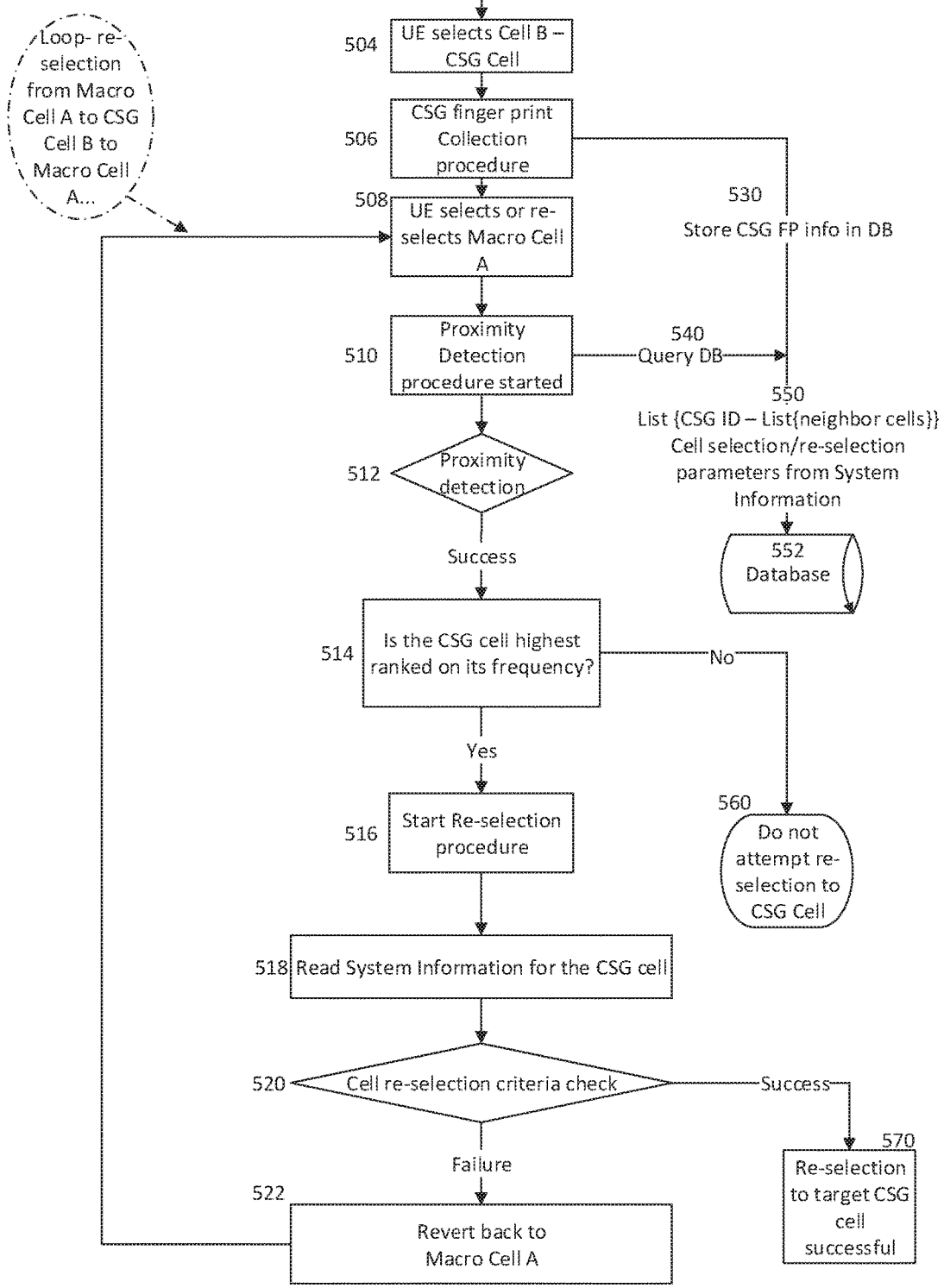
FIG. 5 shows an example of a flowchart depicting a problematic autonomous cell selection process between a macro cell and a CSG cell in an aspect of this disclosure.

FIG. 5 shows an exemplary flowchart 500 explaining the problematic process depicted in FIG. 4 presented by the current 3GPP specifications. Specifically, the cell reselection to a CSG cell (e.g. CSG cell B) is controlled only by the rank of the CSG cell on its frequency. It is appreciated that flowchart 500 is exemplary in nature and may thus be simplified for purposes of explanation.

After a mobile terminal, i.e. user element (UE), is turned on in 502, it attempts to connect with the PLMN. The UE selects the CSG Cell B 504 after a proximity detection has revealed that CSG Cell B is within range of the UE or if the user manually selects CSG Cell B. In 506, the UE conducts the CSG finger print (FP) collection procedure, i.e. collecting the CSG system information. The UE stores this information 530 on a database (DB) 552. At some point in the future, the UE will to select Macro Cell A 508, e.g. the signal strength of CSG cell B is not suitable for cell selection. In 510, the CSG proximity detection is started, at which point the UE will query 540 the DB for the CSG information and selection parameters. In 512, the proximity detection is conducted, where the UE succeeds in detecting the CSG cell B. Upon determining that CSG cell B is the highest ranked on its frequency 514 (if there is only one CSG cell detected, it has to be the highest ranked CSG cell on its frequency), the re-selection procedure to the CSG cell is started 516. In 518, the system information broadcasted by CSG cell B is obtained, followed by a cell re-selection criteria check 520. If the power levels of the CSG cell are too low, i.e. not strong enough to support a connection, the cell re-selection will result in failure, and the UE will revert back to macro cell A 522, where the process starts again in 508 upon selecting Macro Cell A and results in an endless loop if the power levels of CSG cell B are not adequate to support the reselection to the CSG cell. To sum up, the problematic scenario presented by the 3GPP specifications is shown in the path depicted by elements 508-522 of flowchart 500. There can be an indefinite loop along this path in which the UE will not be able to connect to the detected CSG B cell, which will drain the UE of its resources (e.g. power, etc.).

Figure 6:
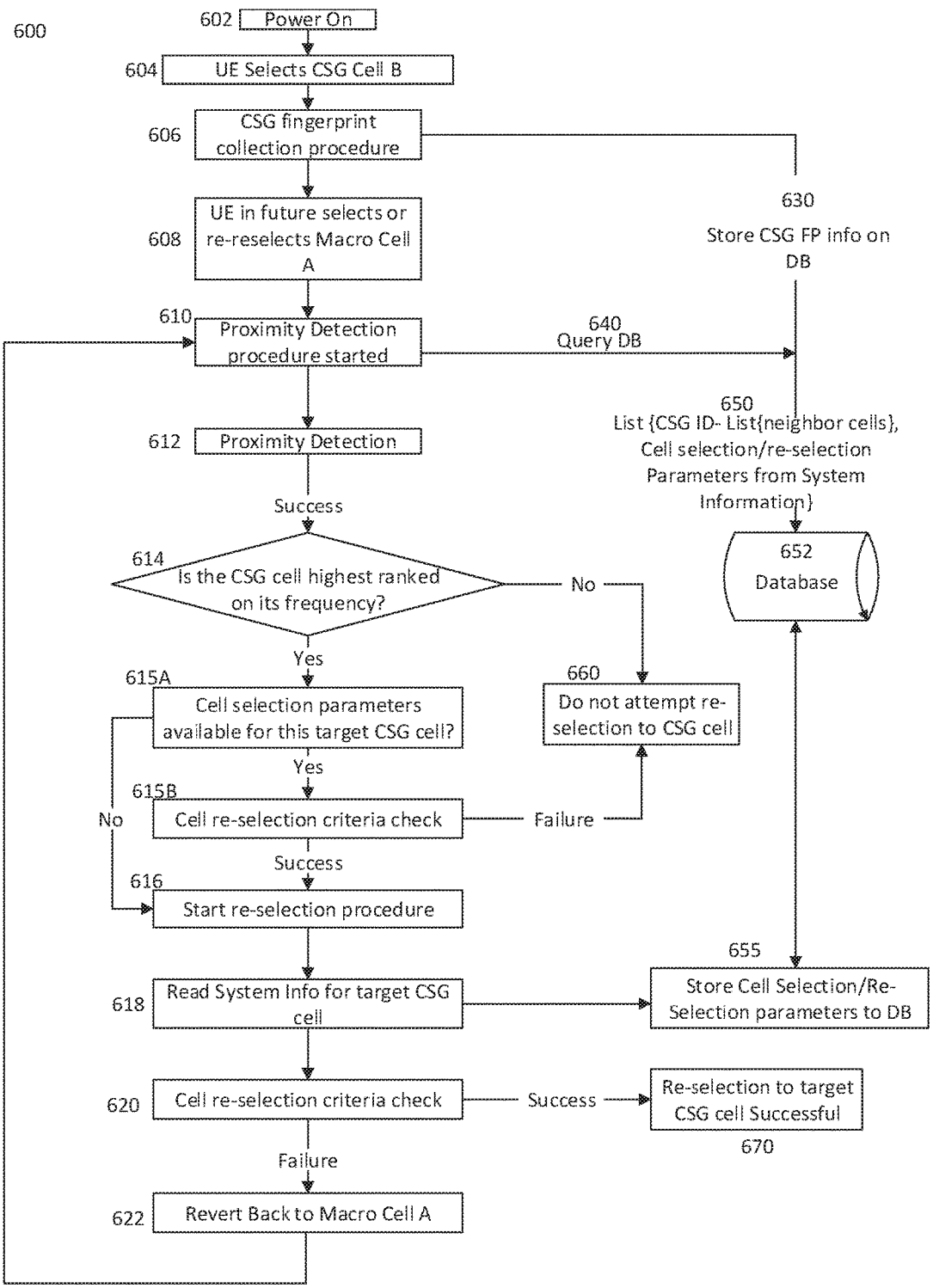
FIG. 6 shows an example of a flowchart portraying an autonomous cell selection process using a database to store CSG cell selection parameters in an aspect of this disclosure.

FIG. 6 shows a flowchart 600 which solves the problems presented by the 3GPP specifications regarding autonomous CSG reselection in an aspect of this disclosure. It is appreciated that flowchart 600 is exemplary in nature and may thus be simplified for purposes of explanation. In order to further simplify this explanation, flowchart 600 is explained in terms of the scenario presented in FIG. 4.

In flowchart 600, the UE is configured to store the cell reselection parameters received in the System Information broadcasted by the CSG cell in a database (DB). For further reselection attempts to the CSG cell, the cell reselection eligibility will be evaluated based on a criteria check for the stored parameters from the DB.

In flowchart 600, several important factors contribute to the solution of preventing the endless loop of cell reselection presented by the 3GPP specifications and demonstrated in FIG. 5.

After a mobile terminal, i.e. user equipment (UE), is turned on in 602, it attempts to connect with the PLMN. The UE selects the CSG Cell B 604 after a proximity detection has revealed that CSG Cell B is within range of the UE or if the user manually selects CSG Cell B. In 606, the UE conducts the CSG finger print (FP) collection procedure, i.e. collecting the CSG system information. The UE stores this information 630 on a database (DB) 652. At some point in the future, the UE will to select Macro Cell A 608, e.g. when the signal strength of CSG cell B is not suitable for cell selection. In 610, the CSG proximity detection is started, at which point the UE will query 640 the DB for the CSG information and selection parameters. In 612, the proximity detection is conducted, where the UE succeeds in detecting a CSG cell, i.e. CSG cell B. Upon determining that CSG cell B is the highest ranked on its frequency 614 (if there is only one CSG cell detected, it has to be the highest ranked CSG cell on its frequency), the UE proceeds to determine if the stored cell selection parameters available for the CSG cell 615A. If the cell selection parameters are available, i.e. the CSG cell has previously been selected, the UE will proceed to perform a cell re-selection criteria check based on these parameters in 615B. In the case that the target CSG cell is CSG cell B, the UE will proceed to the cell re-selection criteria check 615B since the UE has already selected CSG cell B previously in 604.

This criteria check may consist of using the CSG ID or other cell selection parameters from the DB to determine if the CSG cell criteria is suitable for cell re-selection, e.g. if the signal strength is strong enough. The signal strength may be deemed to be to be strong enough, i.e. suitable, if it is at a sufficient level to supports a reliable connection to a network. If this criteria check results in failure, i.e. the signal strength is not strong enough, the UE will not attempt to re-select to the target CSG cell 660 and the UE will stay camped on macro cell A.

If the cell re-selection criteria check in 615B is a success, or if the cell re-selection parameters are not available for a target CSG cell (i.e. this is a first attempt to select the CSG cell) from 615A, the UE will start the re-selection procedure to the target CSG cell 616.

Once the system information for the target CSG cell is read in 618, the Cell selection/re-selection parameters are stored to the DB in 655. In this manner, the UE will be able to perform a cell re-selection criteria check on the target CSG cell in the future without initiating the cell re-selection procedure and also be able to update the DB for CSG cells it has already connected to. This will result in saving the end user from the inconvenience of having to initiate the cell selection procedure in the future, resulting in better connectivity to the network and conservation of resources (i.e. power).

After reading the system information for the target CSG cell and storing the parameters to the local DB, the UE will perform a cell re-selection criteria check 620. If the check is successful, the UE will re-select to the CSG Cell 670. If the criteria check results in failure, the UE will revert back to macro cell A.

The additional criteria implemented in an aspect of this disclosure demonstrated in FIG. 6 (which can be seen, for example, in 615A-616 and 655) allow the UE to store the broadcasted system information of the target CSG cell in a local database (i.e. in a memory component of the UE). For future re-selection attempts to this target CSG cell, the UE can evaluate the cell re-selection conditions based on the parameters stored on the database for the particular target CSG cell, and make the decision whether re-selection should be attempted or if the re-selection should be avoided, even though the target CSG cell may be the highest ranked on its frequency. By implementing the above, the cell re-selection to CSG Cell B will occur only once, and no further re-selection attempts are made unless the CSG cell passes the criteria check described in 615B. In other words, if a cell re-selection attempt to CSG Cell B fails once, the UE will not continuously try to select CSG Cell B even if it is detected and even if it is the highest ranked cell on its frequency until CSG Cell B passes the criteria check (i.e. CSG Cell B's signal strength is suitable for cell re-selection). In this manner, the UE will avoid the endless loop of reverting back to macro cell A, attempting to select to the detected, unsuitable for connection, target CSG cell B, failing, reverting back to the macro cell A, etc.

Figure 7:
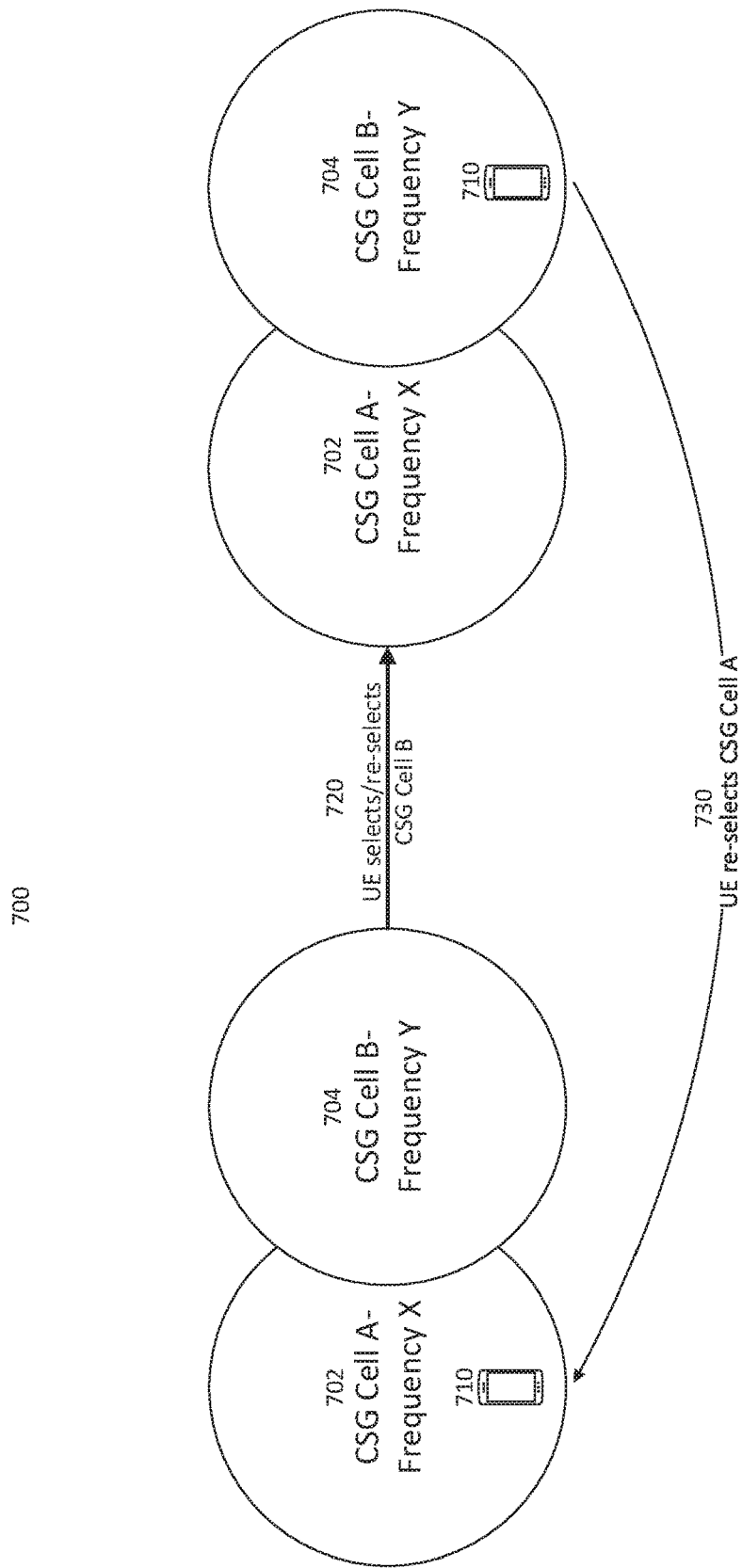
FIG. 7 shows an example of a scenario in which a communication device is stuck in a continuous loop of re-selection between two CSG cells ranked highest on their frequency in an aspect of this disclosure.

FIG. 7 depicts a scenario 700 in which autonomous re-selection between two CSG cells ranked highest on their frequency trigger a loop of re-selecting back and forth between both CSG cells, thereby inconveniencing the end user and draining the UE of its resources, e.g. power. It is appreciated that flowchart 700 is exemplary in nature and may thus be simplified for purposes of explanation.

3GPP TS version 11.6.0, section 5.2.4.8.2 outlines the cell reselection from a CSG cell with a CSG cell. The 3GPP specifications state that while camped on a suitable CSG cell, the UE shall apply the normal cell reselection rules as defined in section 5.2.4. The UE may use an autonomous search function to search for suitable CSG cells on non-serving frequencies. If the UE detects a CSG cell on a non-serving frequency, the UE may reselect to the detected CSG cell if it is the highest ranked cell on its frequency.

When a UE selects/re-selects to a previously finger printed CSG neighbor cell and both CSG cells (the finger printed CSG cell and the CSG cell linked to the finger printed CSG cell) are the best ranked on their frequencies, the UE will enter an indefinite loop of re-selection between the two CSG cells. This indefinite loop occurs because proximity detection of the neighbor CSG cell is successful, thereby triggering an autonomous CSG cell re-selection since both cells are best ranked on their frequencies.

This problematic scenario presented by the 3GPP specifications is shown in FIG. 7 where both CSG Cell A 702 and CSG Cell B 704 are the highest ranked on their frequency. In other words, CSG Cell A 702 is the highest ranked on frequency X and CSG Cell B 704 is the highest ranked cell on frequency Y.

Initially, UE 710 is camped on CSG Cell A 702. After an autonomous search, UE 710 will detect CSG Cell B 704, which is the highest ranked CSG cell on frequency Y. Since CSG Cell B 704 is the highest ranked on its frequency, UE 710 will select/re-select to CSG Cell B 704 as shown by 720.

However, upon selecting/reselecting to CSG Cell B 704, the autonomous search function of UE 710 will detect CSG Cell A 702, which is the highest ranked cell on frequency X. As a result, the UE 710 will reselect back to CSG Cell A 702, starting the process all over again. In other words, as long as the UE 710 is using an autonomous search function, it may jump back and forth between CSG cells since each of the CSG cells are the highest ranked on their frequency. This process is of great inconvenience to the end user and taxing on the UE's resources (e.g. power, etc.).

Figure 8:
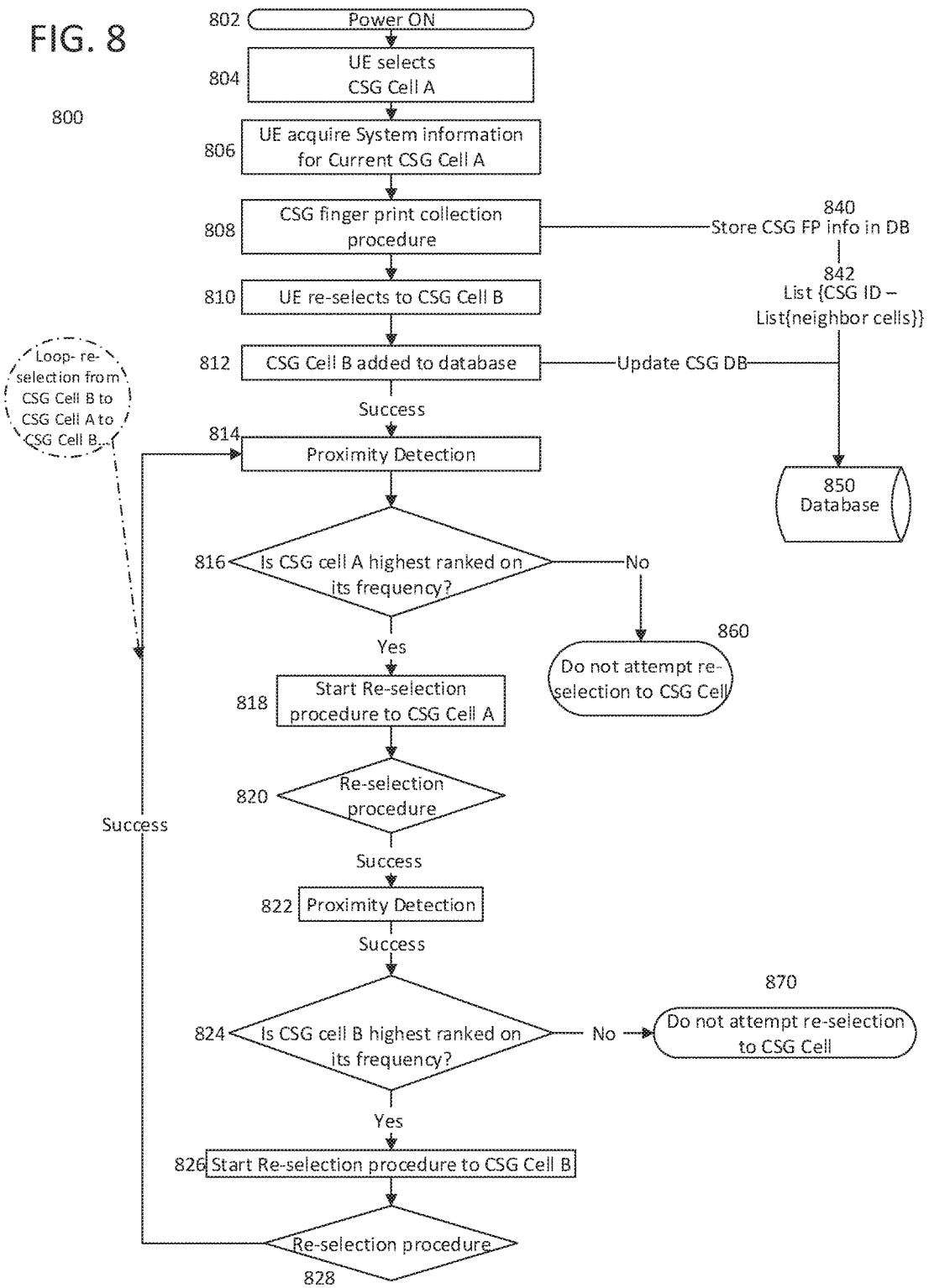
FIG. 8 shows an example of a flowchart portraying a problematic autonomous cell selection process between two CSG cells ranked highest on their frequency in an aspect of this disclosure.

FIG. 8 is an exemplary flowchart showing the problem discussed in FIG. 7 and presented by the 3GPP specifications in more detail. It is appreciated that flowchart 800 is exemplary in nature and may thus be simplified for purposes of explanation.

Initially, after the UE is powered on in 802, the UE selects a first CSG Cell 804, in this case, CSG Cell A, in order to connect to the network. After acquiring the cell re-selection parameters broadcasted in the System Information for CSG Cell A 806, the UE conducts a CSG finger print (FP) collection procedure in 808. The UE stores the CSG FP information 840 in the database 850. This CSG FP information may include a list of CSG IDs and neighbor CSG cells 842.

After conducting the CSG finger print collection and storing the information on the database, the UE detects CSG Cell B. If CSG Cell B is the highest ranked on its frequency, the UE will re-select to CSG Cell B 810 in accordance with 3GPP specifications. The CSG Cell B system information and FP data is added to the database 812.

After successful re-selection to CSG Cell B, the UE conducts a proximity detection 814, wherein the UE detects CSG Cell A. Assuming CSG Cell A is the highest ranked on its frequency 816, the UE will re-select back to CSG Cell A 818-820. Once camped back on CSG Cell A the UE conducts another proximity detection 822, where CSG Cell B is detected, and since it is the highest ranked CSG cell on its frequency, the UE will commence the re-selection process to CSG Cell B 826-828.

Because both CSG Cell A and CSG Cell B are the highest ranked CSG cells on their respective frequencies, the UE is stuck in an indefinite loop of going back and forth between the CSG cells.

In order avoid the loop of re-selecting back and forth between two CSG cells, the UE can use the acquired cell re-selection parameters broadcasted in the System Information. The UE can store these cell re-selection parameters in a database, and in case of autonomous CSG re-selection from one CSG cell to another CSG cell, the UE can evaluate the cell re-selection criteria using a criteria check and select (or re-select) to the better CSG cell, thus avoiding going back and forth between the two CSG cells.

Figure 9:
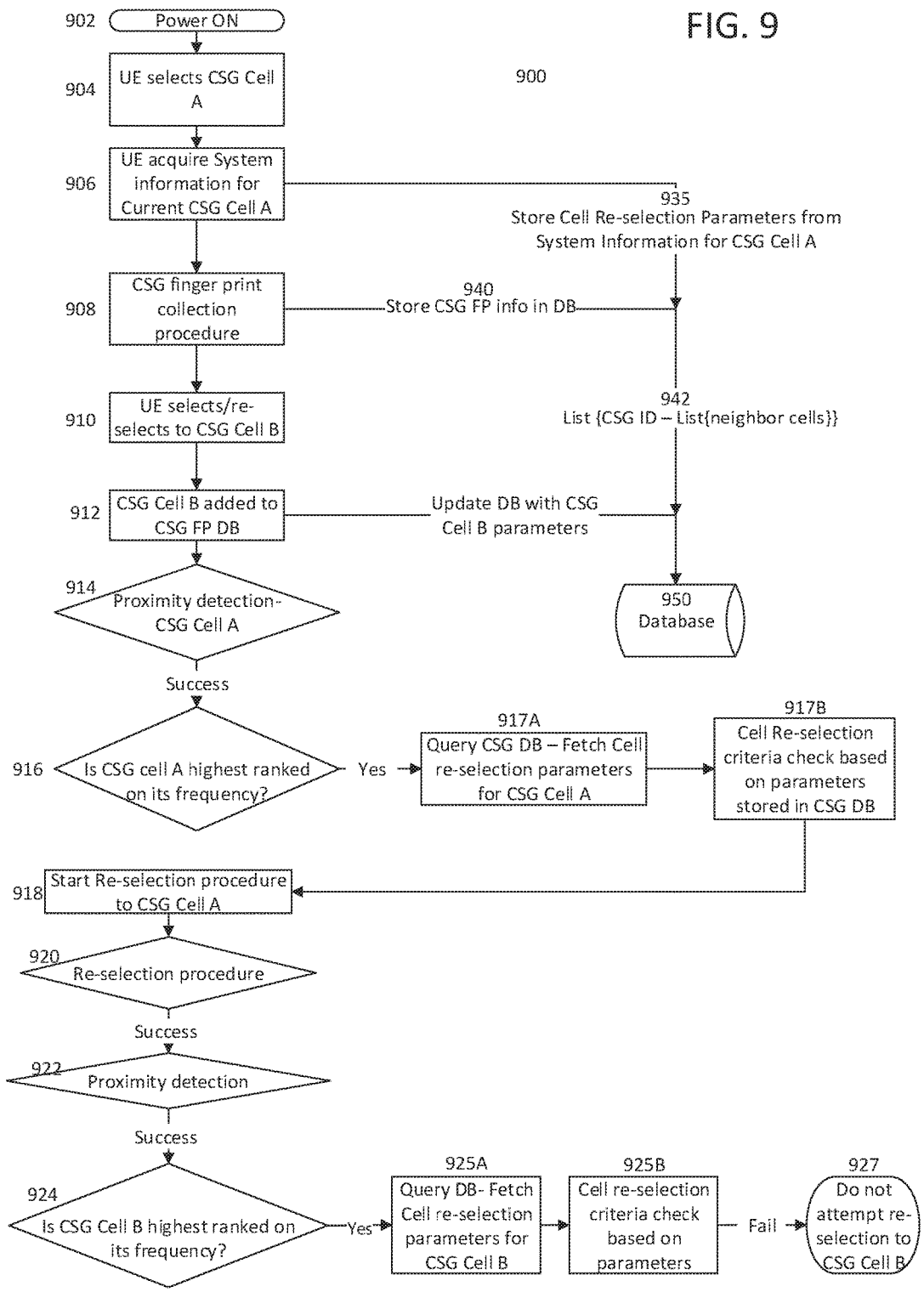
FIG. 9 shows an example of a flowchart portraying an autonomous cell selection process between two CSG cells ranked highest on their frequency when the first CSG cell has better cell selection parameters in an aspect of this disclosure.

FIG. 9 is a flowchart 900 showing an aspect of the disclosure in which a UE avoids the autonomous loop of re-selection between two CSG Cells (CSG Cell A and CSG Cell B) when both CSG Cells are the highest ranked on their frequency. Flowchart 900 is applicable when CSG Cell A (i.e. the first CSG Cell) has better selection criteria, i.e. a better signal strength, than CSG Cell B (i.e. the second CSG Cell). It is appreciated that flowchart 900 is exemplary in nature and may thus be simplified for purposes of explanation.

After the UE is powered on 902, the UE selects a first CSG cell, in this case CSG Cell A, 904 in order to connect to the PLMN. The UE acquires the System Information for CSG Cell A 906 and stores the cell re-selection parameters from the system information for CSG Cell A 935 in a database 950.

After conducting the CSG finger print (FP) collection procedure 908 and storing the CSG FP info 940 in the database (DB), the UE will select CSG Cell B 910 since CSG Cell B is the highest ranked on its frequency. The UE will then update the DB with information from CSG Cell B 912, including the CSG Cell B signal strength. After successfully conducting a proximity detection 914 and detecting CSG Cell A, the UE will determine that CSG Cell A is the highest ranked CSG Cell on its frequency 916.

After determining that CSG Cell A is the highest ranked cell on its frequency 916, the UE queries the database (DB) and retrieves the cell re-selection parameters for CSG Cell A 917A. Then, the UE performs a cell re-selection criteria check 917B based on the parameters stored in the DB, at which point the UE will determine that the criteria (i.e. the signal strength) based on the cell re-selection parameters of CSG Cell A are superior than the parameters of CSG Cell B. The UE will re-select to CSG Cell A, 918-920.

However, upon detecting CSG Cell B after a proximity detection 922 and determining that CSG Cell B is also the highest ranked on its frequency 924, the UE will query the DB and retrieve the cell re-selection parameters for CSG Cell B 925A. Upon performing a cell re-selection criteria check based on the parameters stored in the DB 925B, the UE will determine that CSG Cell A has better criteria, e.g. a better signal strength. Therefore, the cell criteria check to re-select to CSG Cell B will fail and the UE will not attempt to re-select to CSG Cell B 927.

In this manner, upon determining that CSG Cell A has better cell selection/reselection criteria, e.g. a better signal strength, the UE will be able to avoid the loop of hopping back and forth between CSG Cells A and B and thereby avoid the problems of user inconvenience and wasting resources (e.g. power).

Figure 10:
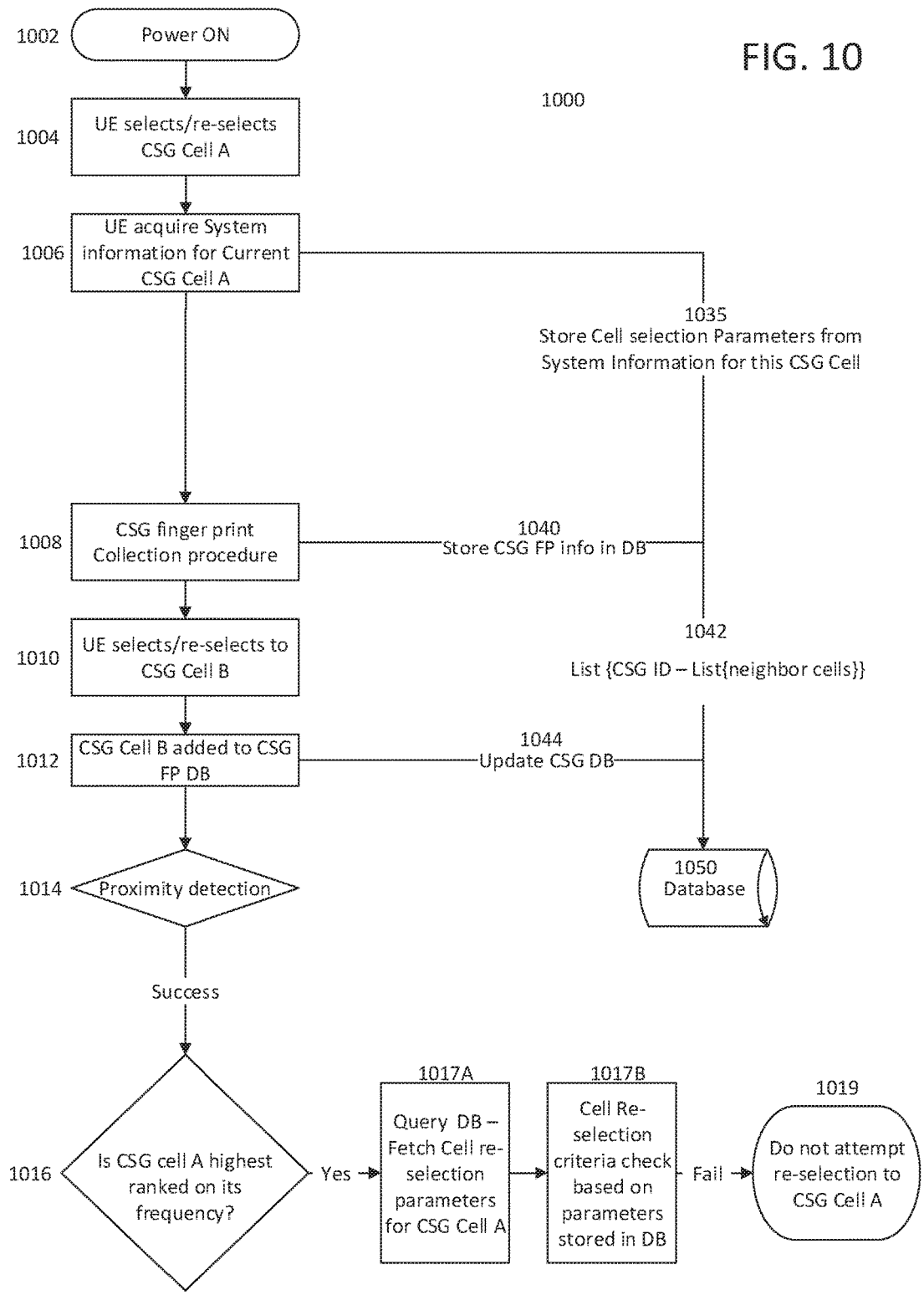
FIG. 10 shows an example of a flowchart portraying an autonomous cell selection process between two CSG cells ranked highest on their frequency when the second CSG cell has better cell selection parameters in an aspect of this disclosure.

FIG. 10 is a flowchart 1000 showing an aspect of the disclosure in which a UE avoids the autonomous loop of re-selection between two CSG Cells (CSG Cell A and CSG Cell B) when both CSG Cells are the highest ranked on their frequency. Flowchart 1000 is applicable when CSG Cell B (i.e. the second CSG Cell) has better selection criteria, i.e. a better signal strength, than CSG Cell A (i.e. the first CSG Cell). It is appreciated that flowchart 1000 is exemplary in nature and may thus be simplified for purposes of explanation.

After the UE is powered on 1002, the UE selects a first CSG cell, in this case CSG Cell A, 1004 in order to connect to the PLMN. The UE acquires the System Information/cell selection parameters for CSG Cell A 1006 and stores the cell selection parameters from the system information for CSG Cell A 1035 in database 1050.

After conducting the CSG finger print (FP) collection procedure 1008 and storing the CSG information 1040 in the database (DB) 1050, the UE selects/re-selects detected CSG Cell B 1010 since CSG Cell B is the highest ranked on its frequency. The UE will then update the DB with information from CSG Cell B 1012. After conducting a proximity detection 1014 and detecting CSG Cell A, the UE will determine that CSG Cell A is the highest ranked CSG Cell on its frequency 1016.

Before re-selecting to CSG Cell A, however, the UE will query the DB and retrieve the cell selection parameters for CSG Cell A 1017A. Then, the UE will conduct a cell re-selection criteria check based on the parameters stored on the DB 1017B. The criteria check based on these parameters retrieved from the DB will indicate that CSG Cell B has better criteria than CSG Cell A (e.g. a better signal strength), and therefore, CSG Cell A will fail the criteria check, and the UE will not attempt to re-select to CSG Cell A 1019.

Figure 11:
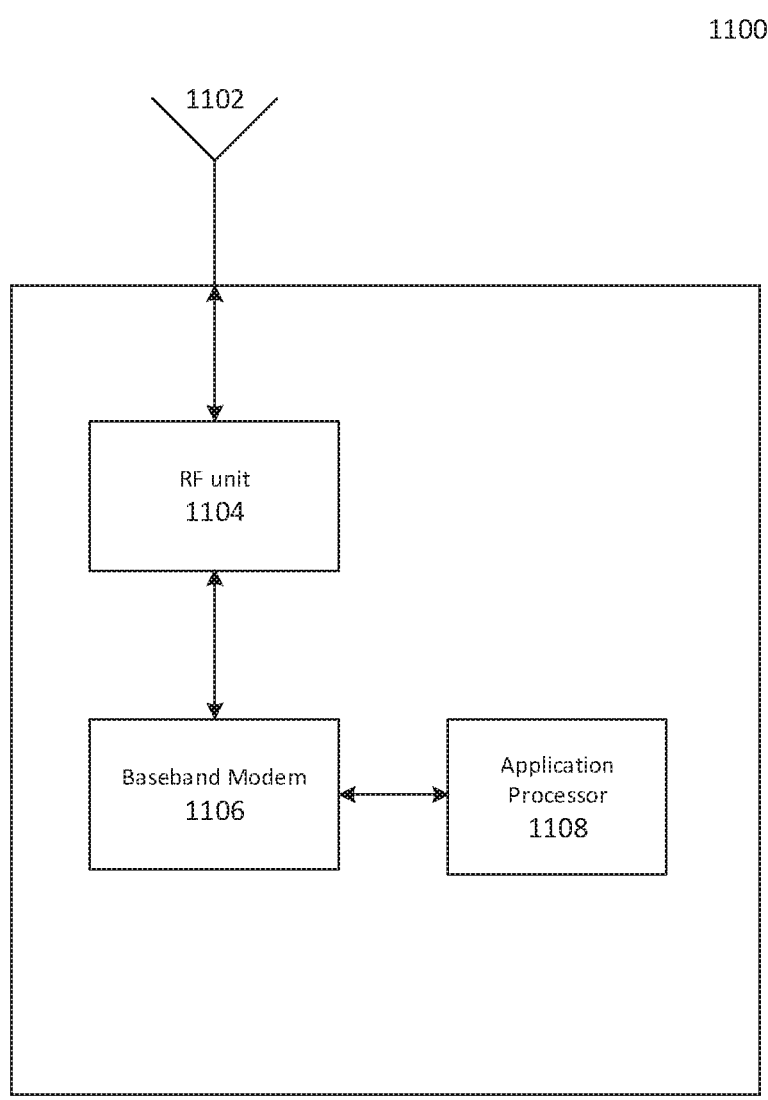
FIG. 11 shows an example of a communication device, i.e. user equipment (UE) or mobile terminal, in an aspect of this disclosure.

FIG. 11 shows a schematic diagram of a mobile terminal 1100 according to one aspect of this disclosure. Mobile terminal 1100 is configured to select CSG cells in an efficient manner which conserves both time and resources will enhancing the end user experience.

As shown in FIG. 11, mobile terminal 1100 may include an antenna 1102, radio frequency (RF) unit 1104 (i.e. RF transceiver), baseband modem 1106, and application processor 1108. As shown in FIG. 11, these components may be implemented as separate components. However, as depicted in FIG. 11, it is appreciated that the configuration of mobile terminal 1100 is for purposes of explanation, and accordingly, one or more of the aforementioned components of mobile terminal 1100 may be integrated into a single equivalent component or divided into multiple components with collective equivalence. It is also appreciated that mobile terminal 1100 may have one or more additional components, such as hardware, software, or firmware elements. For example, mobile terminal 1100 may also include various additional components including processors, microprocessors, at least one memory component, subscriber identity module(s) (SIM), at least one power supply, peripheral device(s) and other specialty or generic hardware, processors, or circuits, etc., in order to support a variety of additional operations. The at least one memory component of mobile terminal 1100 may be configured to store program instructions. The mobile terminal 1100 may have a non-transitory computer readable medium for storing program instructions for causing a processor to execute the program instructions. Mobile terminal 1100 may also include a variety of user input/output devices, such as display(s), keypad(s), touchscreen(s), speaker(s), microphone(s), button(s), camera(s), etc.

In an overview of the operation of mobile terminal 1100, mobile terminal 1100 may be configured to receive and/or transmit wireless signals according to multiple different wireless access protocols or radio access technologies (RATs), for example, any one or combination of: Long-Term Evolution (LTE), Global System for Mobile Communications (GSM), Universal Mobile Telecommunications System (UMTS), Code Division Multiple Access (CDMA), Wideband CDMA (W-CDMA), Wi-Fi, Wireless Local Area Network (WLAN), Bluetooth, etc. It is appreciated that separate components may be provided for each distinct type of compatible wireless signal, such as a dedicated LTE antenna, RF transceiver, and baseband modem for LTE reception and transmission and a dedicated Wi-Fi antenna, RF transceiver, and a baseband modem for Wi-Fi reception and transmission. Alternatively, one or more components of mobile terminal 1100 may be shared between different wireless access protocols, such as, for example, by sharing an antenna 1102 between multiple different wireless access protocols or RATs. In an exemplary aspect of this disclosure, RF unit 1104 and/or baseband modem 1106 may operate according to multiple communication access protocols (i.e. "multi-mode"), and thus may be configured to support one or more of LTE, GSM, and/or UMTS access protocols.

Furthermore, RF unit 1104 may receive frequency wireless signals via antenna 1102, which may be implemented as, for example, a single antenna or an antenna array composed of multiple antennas. RF unit 1104 may include various reception circuitry elements, for example, analog circuitry configured to process externally received signals, such as circuitry to convert externally received RF signals to baseband and/or intermediate frequencies. RF unit 1104 may also include amplification circuitry to amplify externally received signals, such power amplifiers and/or Low Noise Amplifies, although it is appreciated that such components may also implemented separately. RF unit 1104 may additionally include various transmission circuit elements configured to transmit signals, such as, for example, baseband and/or intermediate frequency signals provided by the baseband modem 1106, which may include mixing circuitry to modulate signals onto one or more radio frequency carrier waves and/or amplification circuitry to amplify internal signals before transmission. The RF unit 1104 may provide such signals to antenna 1102 for wireless transmission. Although not explicitly depicted in FIG. 11, RF unit 1104 may be additionally connected to application processor 1108.

Baseband modem 1106 may include digital processing circuit(s) and a baseband memory, and may include one or more additional components, including one or more analog circuits.

The digital processing circuits may be composed of various processing circuitry configured to perform baseband (also including "intermediate") frequency processing, such as Analog to Digital Converters and/or Digital to Analog Converters, modulation/demodulation circuitry, encoding/decoding circuitry, audio codec circuitry, digital signal processing circuitry, etc. The digital processing circuit(s) may include hardware, software, or a combination of hardware and software. Specifically, digital processing circuit(s) of baseband modem 106 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof.

The baseband memory may include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s) etc., or any combination thereof. The baseband memory may be configured to store software elements, which may be retrieved and executed using a processor component of digital processing circuitry. The baseband memory may be implemented as one or more separate components in the baseband modem 1106 and may also be partially or fully integrated with the digital processing circuitry.

The baseband modem 1106 may be configured to operate one or more protocol stacks, such as a GSM protocol stack, an LTE protocol stack, a UMTS protocol stack, etc. or any combination thereof. Baseband modem 1106 may be multimode and may thus be configured to operate in accordance with multiple RATs by executing multiple protocol stacks simultaneously. The digital processing circuit(s) in the baseband modem may therefore include a processor configured to execute program code in accordance with the protocol stacks of each associated RAT. The baseband memory may be store the aforementioned program code. The baseband modem 1106 may be configured to control one or more further components of mobile terminal 1100. The protocol stack(s) of baseband modem 1106 may be configured to control operation of the baseband modem 1106, such as in order to transmit and receive mobile communication in accordance with the corresponding RAT(s).

It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of baseband modem 1106 may be detailed herein substantially in terms of functional operation in recognition that a person of skill in the art may readily appreciate the various possible structural realizations of baseband modem 1106 using digital processing circuitry that will provide the desired functionality.

In an exemplary aspect of the disclosure, the baseband modem is configured to instruct the RF unit (i.e. the transceiver) to receive a CSG information (consisting of a system information and supported RATs) from at least one CSG cell, collect the CSG information from the at least one CSG cell, store the CSG information in a database, retrieve the CSG information from the database upon a CSG selection request for a target CSG cell, and instruct the communication device to connect to the target CSG cell based on the CSG information stored on the database.

In another exemplary aspect of this disclosure, the baseband modem is configured to, in a first selection of the CSG cell, collect the CSG information received from thee RF unit and store the CSG information in a databse; select a macrocell for connecting to a network such as the PLMN; detect the CSG cell; and trigger a switch to the CSG cell after determining that the CSG cell is the highest ranked cell on its frequency, retrieving the CSG information from the database, and performing a criteria check, which may consist of using the CSG information in order to check to see if signal strength of the CSG cell is appropriate for cell selection.

In another exemplary aspect of this disclosure, the baseband modem is configured to, in a first selection of a first CSG cell, collect a first CSG information from the first CSG cell and store its information in a database; in a first selection of a second CSG cell, collect the CSG information from the second CSG cell and store its information in a database; select the first (or second) CSG cell for connecting to a network, e.g. the PLMN; detect the second (or first) CSG cell; and trigger a switch to the other CSG cell after determining that the other CSG cell is the highest ranked cell on its frequency, retrieving the other CSG's cell CSG information from the database, and performing a criteria check, which may consist of using the other CSG's cell CSG information in order to check if the other CSG's cell signal strength is better than the one that the communication device is currently connected to.

The application processor 1108 may be implemented as a Central Processing Unit (CPU), and may function as a controller of mobile terminal 1100. The application processor 1108 may be configured to execute various applications and/or programs of mobile terminal 1100, such as, for example, applications corresponding to program code stored in a memory component of mobile terminal 1100 (not shown in FIG. 11). The application processor 1108 may also be configured to control one or more further components of mobile terminal 1100, such as, for example, input/output devices (e.g. display(s), keypad(s), touchscreen(s), speaker(s), microphone(s), button(s), etc.) peripheral devices, a memory, power supplies, external device interfaces, etc.

Although the baseband modem 1106 and application processor 1108 are depicted separately in FIG. 11, it is appreciated that the figure is not limiting in nature. It is understood that the baseband modem 1106 and the application processor 1108 may be implemented separately, implemented together (i.e. as an integrated unit), partially implemented together, etc.

In Example 1, a method for a communication device to connect to a closed subscriber group (CSG) cell, comprising: collecting a CSG information from at least one CSG cell, the CSG information comprising a system information and supported radio access technologies (RATs) for the at least one CSG cell; storing the CSG information in a database; retrieving the CSG information from the database upon a CSG selection request for a target CSG cell; and connecting to the target CSG cell based on the CSG information.

In Example 2, the subject matter of example 1, further comprising storing the database in a memory of the communication device.

In Example 3, the subject matter of any one of examples 1 or 2, further comprising initiating the collecting a CSG information from at least one CSG cell by a manual CSG search request.

In Example 4, the subject matter of any one of examples 1-3, wherein the CSG information is collected by a frequency scan.

In Example 5, the subject matter of example 4, the frequency scan being conducted in a user specified RAT order.

In Example 6, the subject matter of any one of examples 1-5, the system information comprising a CSG cell identity and a public land mobile network (PLMN) identity.

In Example 7, the subject matter of any one of examples 1-6, the CSG cell selection request comprising a manual selection of the target CSG cell.

In Example 8, the subject matter of any one of examples 1-7, wherein retrieving the CSG information from the database further comprises identifying the target CSG cell in the database by the target CSG cell identity.

In Example 9, the subject matter of any one of examples 1-8, further comprising ordering of the supported RATs in a user specified RAT preference order.

In Example 10, the subject matter of example 9, wherein the first supported RAT in the user specified RAT preference order is a preferred RAT.

In Example 11, the subject matter of example 10, wherein connecting to the target CSG cell based on the CSG information comprises connecting via the preferred RAT.

In Example 12, a method for a communication device to avoid repeated attempts of selection to a closed subscriber group (CSG) cell, comprising: in a first selection of the CSG cell: collecting a CSG information from the CSG cell; and storing the CSG information in a database; selecting another cell; detecting the CSG cell; triggering a switch to the CSG cell after: determining that the CSG cell is the highest ranked cell on its frequency; retrieving the CSG information from the database; and performing a criteria check, the criteria check comprising using the CSG information to check a signal strength of the CSG cell.

In Example 13, the subject matter of example 12, further comprising storing the database in a memory of the communication device.

In Example 14, the subject matter of any one of examples 12 or 13, the first selection of the CSG cell comprising an autonomous selection or a manual selection.

In Example 15, the subject matter of any one of examples 12-14, further comprising detecting the CSG cell by a proximity detection.

In Example 16, the subject matter of any one of examples 12-15, the CSG information comprising a system information broadcast by the CSG cell.

In Example 17, the subject matter of example 16, the system information comprising a CSG identity and a list of neighboring CSG cells.

In Example 18, the subject matter of any one of examples 12-17, wherein triggering a switch to the CSG cell further comprises determining if the signal strength of the CSG cell is suitable for selection to the CSG cell.

In Example 19, the subject matter of example 18, further comprising wherein the signal strength is determined to be suitable for selection to the CSG cell if the signal strength can support a connection of the communication device to a network.

In Example 20, the subject matter of any one of example 12-19, further comprising: wherein selecting another cell comprises a first selection of a second CSG cell, comprising collecting a second CSG information from the second CSG cell; and storing the second CSG information in a database.

In Example 21, the subject matter of example 20, further comprising performing the criteria check to compare the signal strength of the CSG cell to the signal strength of the second CSG cell.

In Example 22, the subject matter of any one of examples 20 or 21, the first selection of the CSG cell comprising an autonomous selection or a manual selection.

In Example 23, the subject matter of any one of examples 20-22, the first selection of the second CSG cell comprising an autonomous selection or a manual selection.

In Example 24, the subject matter of any one of examples 20-23, further comprising detecting the CSG cell by a proximity detection.

In Example 25, the subject matter of any one of examples 20-24, the CSG information comprising a first system information broadcasted by the CSG cell and the second CSG information comprising a second system information broadcasted by the second CSG cell.

In Example 26, the subject matter of example 25, the first system information comprising a CSG identity and a list of neighboring CSG cells for the CSG cell and the second system information comprising a CSG identity and a list of neighboring CSG cells for the second CSG cell.

In Example 27, the subject matter of any one of examples 20-26, wherein triggering a switch to the CSG cell further comprises determining that the signal strength of the CSG cell is better than a signal strength of the second CSG cell.

In Example 28, a communication device configured to connect to a closed subscriber group (CSG) cell, comprising: a radio frequency (RF) unit configured to receive a CSG information from at least one CSG cell, the CSG information comprising a system information and supported radio access technologies (RATs) for the at least one CSG cell; a baseband modem configured to: instruct the RF unit to receive the CSG information from the at least one CSG cell; collect the CSG information from the at least one CSG cell; store the CSG information in a database; retrieve the CSG information from the database upon a CSG selection request for a target CSG cell; and direct the communication device to connect to the target CSG cell based on the CSG information.

In Example 29, the subject matter of example 28, further comprising a memory configured to store the database.

In Example 30, the subject matter of any one of examples 28 or 29, the baseband modem further configured to trigger the RF unit to collect the CSG information from at least one CSG cell after a manual CSG search request.

In Example 31, the subject matter of any one of examples 28-30, the RF unit further configured to collect the CSG information by a frequency scan.

In Example 32, the subject matter of example 31, the RF unit further configured to conduct the frequency scan in a user specified RAT order.

In Example 33, the subject matter of any one of examples 28-32, wherein the system information comprises a CSG cell identity and a public land mobile network (PLMN) identity.

In Example 34, the subject matter of any one of examples 28-33, the CSG cell selection request comprising a manual selection of the target CSG cell.

In Example 35, the subject matter of any one of examples 28-34, the baseband modem further comprised to retrieve the CSG information from the database for the target CSG cell by identifying the target CSG cell in the database by the target CSG cell identity.

In Example 36, the subject matter of any one of examples 28-35, the baseband modem further configured to order the supported RATs for the target CSG cell in a user specified RAT preference order.

In Example 37, the subject matter of example 36, wherein the first supported RAT in the user specified RAT preference order is a preferred RAT.

In Example 38, the subject matter of example 37, wherein connecting to the target CSG cell based on the CSG information comprises connecting via the preferred RAT.

In Example 39, a communication device configured to avoid repeated attempts of selection to a closed subscriber group (CSG) cell, comprising: a radio frequency (RF) unit configured to receive a CSG information from a CSG cell; a baseband modem configured to: in a first selection of the CSG cell: collect the CSG information received by the RF unit; and store the CSG information in a database; select another cell; detect the CSG cell via the RF unit; trigger a switch to the CSG cell after: determining that the CSG cell is the highest ranked cell on its frequency; retrieving the CSG information from the database; and performing a criteria check, the criteria check comprising using the CSG information to check a signal strength of the CSG cell.

In Example 40, the subject matter of example 39, further comprising a memory configured to store the database.

In Example 41, the subject matter of any one of examples 39 or 40, the first selection of the CSG cell comprising an autonomous selection or a manual selection.

In Example 42, the subject matter of any one of examples 39-41, the baseband modem further configured to detect the CSG cell by a proximity detection.

In Example 43, the subject matter of any one of examples 39-42, the CSG information comprising a system information broadcasted by the CSG cell.

In Example 44, the subject matter of example 43, the system information comprising a CSG identity and a list of neighboring CSG cells.

In Example 45, the subject matter of any one of examples 39-44, the baseband modem further configured to trigger the switch to the CSG cell after determining if the signal strength of the CSG cell is suitable for selection to the CSG cell.

In Example 46, the subject matter of example 45, wherein determining if the signal strength is suitable for selection to the CSG cell comprises determining whether the signal strength can support a connection to a network.

In Example 47, the subject matter of any one of examples 39-46, the baseband modem further configured to select another cell comprising a first selection of a second CSG cell, wherein the baseband modem is further configured to collect a second CSG information from the second CSG cell, and store the second CSG information in the database.

In Example 48, the subject matter of example 47, further comprising a memory configured to store the database.

In Example 49, the subject matter of any one of examples 47 or 48, the first selection of the CSG cell comprising an autonomous selection or a manual selection.

In Example 50, the subject matter of any one of examples 47-49, the first selection of the second CSG cell comprising an autonomous selection or a manual selection.

In Example 51, the subject matter of any one of examples 47-50, the baseband modem further configured to detect the CSG cell by a proximity detection.

In Example 52, the subject matter of any one of examples 47-51, the CSG information comprising a first system information broadcasted by the CSG cell and the second CSG information comprising a second system information broadcasted by the second CSG cell.

In Example 53, the subject matter of example 52, the first system information comprising a CSG identity and a list of neighboring CSG cells for the CSG cell and the second system information comprising a CSG identity and a list of neighboring CSG cells for the second CSG cell.

In Example 54, the subject matter of any one of examples 47-53, the baseband modem further configured to trigger the switch to the CSG cell after determining that the signal strength of the CSG cell is better than a signal strength of the second CSG cell.

In Example 55, a non-transitory computer readable medium containing program instructions for instructing a communication device to connect to a closed subscriber group (CSG) cell, comprising: collecting a CSG information from at least one CSG cell, the CSG information comprising a system information and supported radio access technologies (RATs) for the at least one CSG cell; storing the CSG information in a database; retrieving the CSG information from the database upon a CSG selection request for a target CSG cell; and connecting to the target CSG cell based on the CSG information.

In Example 56, the subject matter of example 55, further comprising storing the database in a memory of the communication device.

In Example 57, the subject matter of any one of examples 55 or 56, further comprising initiating the collecting a CSG information from at least one CSG cell by a manual CSG search request.

In Example 58, the subject matter of any one of examples 55-57, wherein the CSG information is collected by a frequency scan.

In Example 59, the subject matter of example 58, the frequency scan being conducted in a user specified RAT order.

In Example 60, the subject matter of any one of examples 55-59, the system information comprising a CSG cell identity and a public land mobile network (PLMN) identity.

In Example 61, the subject matter of any one of examples 55-60, the CSG cell selection request comprising a manual selection of the target CSG cell.

In Example 62, the subject matter of any one of examples 55-61, wherein retrieving the CSG information from the database further comprises identifying the target CSG cell in the database by the target CSG cell identity.

In Example 63, the subject matter of any one of examples 55-62, further comprising ordering of the supported RATs in a user specified RAT preference order.

In Example 64, the subject matter of example 63, wherein the first supported RAT in the user specified RAT preference order is a preferred RAT.

In Example 65, the subject matter of example 64, wherein connecting to the target CSG cell based on the CSG information comprises connecting via the preferred RAT.

In Example 66, a non-transitory computer readable medium containing program instructions for instructing a communication device to avoid repeated attempts of selection to a closed subscriber group (CSG) cell, comprising: in a first selection of the CSG cell: collecting a CSG information from the CSG cell; and storing the CSG information in a database; selecting another cell; detecting the CSG cell; triggering a switch to the CSG cell after: determining that the CSG cell is the highest ranked cell on its frequency; retrieving the CSG information from the database; and performing a criteria check, the criteria check comprising using the CSG information to check a signal strength of the CSG cell.

In Example 67, the subject matter of example 66, further comprising storing the database in a memory of the communication device.

In Example 68, the subject matter of any one of examples 66 or 67, the first selection of the CSG cell comprising an autonomous selection or a manual selection.

In Example 69, the subject matter of example 68, further comprising detecting the CSG cell by a proximity detection.

In Example 70, the subject matter of any one of examples 66-69, the CSG information comprising a system information broadcast by the CSG cell.

In Example 71, the subject matter of example 70, the system information comprising a CSG identity and a list of neighboring CSG cells.

In Example 72, the subject matter of any one of examples 66-71, wherein triggering a switch to the CSG cell further comprises determining if the signal strength of the CSG cell is suitable for selection to the CSG cell.

In Example 73, the subject matter of example 72, further comprising wherein the signal strength is determined to be suitable for selection to the CSG cell if the signal strength can support a connection of the communication device to a network.

In Example 74, the subject matter of any one of examples 66-73, further comprising: wherein selecting another cell comprises a first selection of a second CSG cell, comprising collecting a second CSG information from the second CSG cell; and storing the second CSG information in a database.

In Example 75, the subject matter of example 74, further comprising performing the criteria check to compare the signal strength of the CSG cell to the signal strength of the second CSG cell.

In Example 76, the subject matter of any one of examples 74 or 75, the first selection of the CSG cell comprising an autonomous selection or a manual selection.

In Example 77, the subject matter of any one of examples 74-76, the first selection of the second CSG cell comprising an autonomous selection or a manual selection.

In Example 78, the subject matter of any one of examples 74-77, further comprising detecting the CSG cell by a proximity detection.

In Example 79, the subject matter of any one of examples 74-78, the CSG information comprising a first system information broadcasted by the CSG cell and the second CSG information comprising a second system information broadcasted by the second CSG cell.

In Example 80, the subject matter of example 79, the first system information comprising a CSG identity and a list of neighboring CSG cells for the CSG cell and the second system information comprising a CSG identity and a list of neighboring CSG cells for the second CSG cell.

In Example 81, the subject matter of any one of examples 74-80, wherein triggering a switch to the CSG cell further comprises determining that the signal strength of the CSG cell is better than a signal strength of the second CSG cell.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device configured to connect to a closed subscriber group (CSG) cell, comprising:
   a radio frequency (RF) transceiver configured to receive a CSG information from at least one CSG cell, the CSG information comprising a system information and one or more supported radio access technologies (RATs) for each of the at least one CSG cell;
   a baseband modem configured to:
   initiate collecting the CSG information in response to a manual CSG search request;
   store the CSG information in a database;
   retrieve the CSG information from the database upon a CSG selection request for a target CSG cell, wherein the at least one CSG cell includes the target CSG cell; and
   direct the communication device to connect to the target CSG cell based on one of the one or more supported RATs of the retrieved CSG information.

2. The communication device of claim 1, further comprising a memory configured to store the database.

3. The communication device of claim 1, the baseband modem further comprised to retrieve the CSG information from the database for the target CSG cell by identifying the target CSG cell in the database by the target CSG cell identity.

4. The communication device of claim 1, the baseband modem further configured to order the one or more supported RATs for the target CSG cell in a user specified RAT preference order.

5. The communication device of claim 4, wherein the first supported RAT in the user specified RAT preference order is a preferred RAT.

6. The communication device of claim 5, wherein connecting to the target CSG cell based on the CSG information comprises connecting via the preferred RAT.

7. A method for a communication device to connect to a closed subscriber group (CSG) cell, comprising:
   initiating the collection of a CSG information from at least one CSG cell in response to a manual CSG search request, the CSG information comprising a system information and one or more supported radio access technologies (RATs) for each of the at least one CSG cell;
   storing the CSG information in a database;
   retrieving the CSG information from the database upon a CSG selection request for a target CSG cell, wherein the at least one CSG cell comprises the target CSG cell; and
   connecting to the target CSG cell based on one of the one or more supported RATs of the retrieved CSG information.

8. The method of claim 7, further comprising collecting the CSG information by a frequency scan.

9. The method of claim 7, the CSG cell selection request comprising a manual selection of the target CSG cell.

10. The method of claim 7, wherein retrieving the CSG information from the database further comprises identifying the target CSG cell in the database by the target CSG cell identity.

11. The method of claim 7, further comprising ordering of the one or more supported RATs in a user specified RAT preference order.

12. The method of claim 11, wherein the first supported RAT in the user specified RAT preference order is a preferred RAT.

13. The method of claim 12, wherein connecting to the target CSG cell based on the CSG information comprises connecting via the preferred RAT.

14. A communication device configured to connect to a closed subscriber group (CSG) cell, the communication device comprising:
   a radio frequency (RF) transceiver configured to receive a CSG information from at least one CSG cell, including a target CSG cell, wherein the CSG information comprises one or more supported radio access technologies (RATs) for each of the at least one CSG cell;
   a memory configured to store the CSG information for each of the at least one CSG cell;
   a baseband modem configured to:
   initiate collecting the CSG information in response to a manual CSG search request, wherein the CSG information is collected during a CSG cell scan;
   retrieve the CSG information for the target CSG cell from the memory upon receiving a selection request for the target CSG cell; and
   direct the communication device to connect to the target CSG cell using a first RAT of the one or more supported RATs from the retrieved CSG information.

15. The communication device of claim 14, the baseband modem configured to direct the memory to store the CSG information for each of the at least one CSG cell.

16. The communication device of claim 14, wherein when the CSG information for the target CSG cell includes a plurality of RATs, the baseband modem is configured to select the first RAT based on a user specified RAT preference order.

17. One or more non-transitory computer-readable media storing instructions thereon that, when executed by at least one processor, direct the at least one processor to perform a method comprising:
   initiating the collection of a CSG information from at least one CSG cell in response to a manual CSG search request, the CSG information comprising a system information and one or more supported radio access technologies (RATs) for each of the at least one CSG cell;
   storing the CSG information in a database;
   retrieving the CSG information from the database upon a CSG selection request for a target CSG cell, wherein the at least one CSG cell comprises the target CSG cell; and
   connecting to the target CSG cell based on one of the one or more supported RATs of the retrieved CSG information.

18. The one or more non-transitory computer-readable media of claim 16, the method further comprising, wherein when the CSG information for the target CSG cell includes a plurality of RATs, selecting the first RAT based on a user specified RAT preference order.

* * * * *